(12) United States Patent
Johnson et al.

(10) Patent No.: US 7,636,734 B2
(45) Date of Patent: Dec. 22, 2009

(54) METHOD FOR PROBABILISTIC ANALYSIS OF MOST FREQUENTLY OCCURRING ELECTRONIC MESSAGE ADDRESSES WITHIN PERSONAL STORE (.PST) FILES TO DETERMINE OWNER WITH CONFIDENCE FACTOR BASED ON RELATIVE WEIGHT AND SET OF USER-SPECIFIED FACTORS

(75) Inventors: Christopher L. Johnson, Kent, WA (US); Richard Dean Webb, Lynnwood, WA (US); David Thomas Kearney, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 658 days.

(21) Appl. No.: 11/159,449

(22) Filed: Jun. 23, 2005

(65) Prior Publication Data

US 2006/0294090 A1 Dec. 28, 2006

(51) Int. Cl.
*G06F 17/00* (2006.01)
*G06F 17/30* (2006.01)
*G06F 3/001* (2006.01)

(52) U.S. Cl. .................. 707/104.1; 707/7; 707/102; 715/752

(58) Field of Classification Search .......... 707/1–2, 707/7–8, 10, 100, 102, 104.1, 200; 709/203, 709/206, 219–220, 241; 715/752; 455/418, 455/466; 379/93.24, 100.08
See application file for complete search history.

(56) References Cited

U.S. PATENT DOCUMENTS

| | | | | |
|---|---|---|---|---|
| 6,154,783 | A * | 11/2000 | Gilmour et al. | 709/245 |
| 6,675,162 | B1 * | 1/2004 | Russell-Falla et al. | 707/5 |
| 6,829,607 | B1 * | 12/2004 | Tafoya et al. | 707/6 |
| 7,016,939 | B1 * | 3/2006 | Rothwell et al. | 709/206 |
| 2002/0065891 | A1 * | 5/2002 | Malik | 709/206 |
| 2002/0069198 | A1 * | 6/2002 | Stebbings et al. | 707/7 |

(Continued)

FOREIGN PATENT DOCUMENTS

WO WO 03/010680 * 2/2003

(Continued)

OTHER PUBLICATIONS

Derek Lam et al. "exploiting E-mail structure to improve summarization", published year 2002, pp. 1-8.*

(Continued)

*Primary Examiner*—Srirama Channavajjala
(74) *Attorney, Agent, or Firm*—Woodcock Washburn LLP

(57) ABSTRACT

A probabilistic process to determine the owner of an electronic file, such as a Personal Store (.pst). A weighted analysis of multiple factors is performed including the operating system file owner, a user running the process, a "top Y most frequently occurring addresses" when analyzing "X number of sent then received messages," and a number of occurrences of each "top Y most frequently occurring address." Other factors, such as the ability to resolve against a directory service may be used. Each of the "top Y most frequently occurring addresses" is analyzed to calculate its weight according to a predetermined relationship and the address is compared to the operating system file owner and a logged-on user value. If there is a match, that value is returned as the probable owner of the file.

16 Claims, 3 Drawing Sheets

U.S. PATENT DOCUMENTS

| | | | |
|---|---|---|---|
| 2002/0128925 A1* | 9/2002 | Angeles | 705/26 |
| 2003/0172291 A1* | 9/2003 | Judge et al. | 713/200 |
| 2003/0182310 A1* | 9/2003 | Charnock et al. | 707/104.1 |
| 2004/0139042 A1* | 7/2004 | Schirmer et al. | 707/1 |
| 2004/0153512 A1* | 8/2004 | Friend | 709/206 |
| 2004/0186848 A1* | 9/2004 | Kobashikawa et al. | 707/102 |
| 2004/0205133 A1* | 10/2004 | Adler | 709/206 |
| 2004/0243407 A1* | 12/2004 | Yu et al. | 704/240 |
| 2005/0022008 A1* | 1/2005 | Goodman et al. | 713/201 |
| 2005/0080856 A1* | 4/2005 | Kirsch | 709/206 |
| 2005/0198144 A1* | 9/2005 | Kraenzel et al. | 709/206 |
| 2005/0222981 A1* | 10/2005 | Lawrence et al. | 707/3 |
| 2005/0262209 A1* | 11/2005 | Yu | 709/206 |
| 2006/0165289 A1* | 7/2006 | Boss et al. | 382/182 |
| 2007/0043817 A1* | 2/2007 | Oliver et al. | 709/206 |
| 2008/0033946 A1* | 2/2008 | Bhogal et al. | 707/7 |

FOREIGN PATENT DOCUMENTS

| | | | |
|---|---|---|---|
| WO | WO 2004/102858 | * | 11/2004 |
| WO | WO 2006/119342 | * | 11/2006 |
| WO | WO 2006/119508 | * | 11/2006 |

OTHER PUBLICATIONS

Chih-Chien Wang, "Sender and Receiver Addresses as Cues for Anti-Spam Filtering", Journal of Research and Practice in Information Technology, vol. 36, No. 1, Feb. 2004, pp. 3-7.*

* cited by examiner

METHOD FOR PROBABILISTIC ANALYSIS OF MOST FREQUENTLY OCCURRING ELECTRONIC MESSAGE ADDRESSES WITHIN PERSONAL STORE (.PST) FILES TO DETERMINE OWNER WITH CONFIDENCE FACTOR BASED ON RELATIVE WEIGHT AND SET OF USER-SPECIFIED FACTORS

FIELD OF THE INVENTION

This invention relates in general to the field of content analysis. More particularly, this invention relates to a probabilistic analysis of the content of a file to determine an owner of the file.

BACKGROUND OF THE INVENTION

Organizations are becoming increasingly sensitive to the issues surrounding regulatory compliance, data management, and disaster recoverability. In a MICROSOFT Exchange environment, client-side Personal Folder Information Store (PST) files provide a means for end users to create stores of messaging data that is beyond the management ability of an organization's IT staff. The use of these files should be discouraged in a managed environment, especially one that is subject to regulatory compliance rules. To address this issue, it is possible to administratively restrict the use and creation of .pst files. Additionally, several tools are available that allow the programmatic import of existing .pst data into the centralized MICROSOFT Exchange database(s).

Despite these tools, no inventory and analysis tools currently exist that can provide an organization with a useful picture of the amount of data in .pst files and ownership thereof. This information enables planning for a fully centralized messaging data environment. Ownership information also enables an efficient process for importation or other disposition of the existing/legacy .pst data.

SUMMARY OF THE INVENTION

A probabilistic process to determine the owner of an electronic file, such as a Personal Store (.pst). A weighted analysis of multiple factors is performed including the operating system file owner, a user running the process, a "top Y most frequently occurring addresses" when analyzing "X number of sent then received messages," and a number of occurrences of each "top Y most frequently occurring address." Other factors, such as the ability to resolve against a directory service may be used.

Each of the "top Y most frequently occurring addresses" is analyzed to calculate its weight according to a predetermined relationship. Next, each address is compared to the operating system file owner and a logged-on user value to determine weather there is a match with the directory service resolved name for the address. If there is a match, that value is returned as the probable owner of the file. The combined weights of the matching values will be returned as a "confidence factor." If there is no match, the weights of all values are analyzed, and the top weighted entry will be returned as the probable owner and the combined weights of the matching values will be returned as the "confidence factor."

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
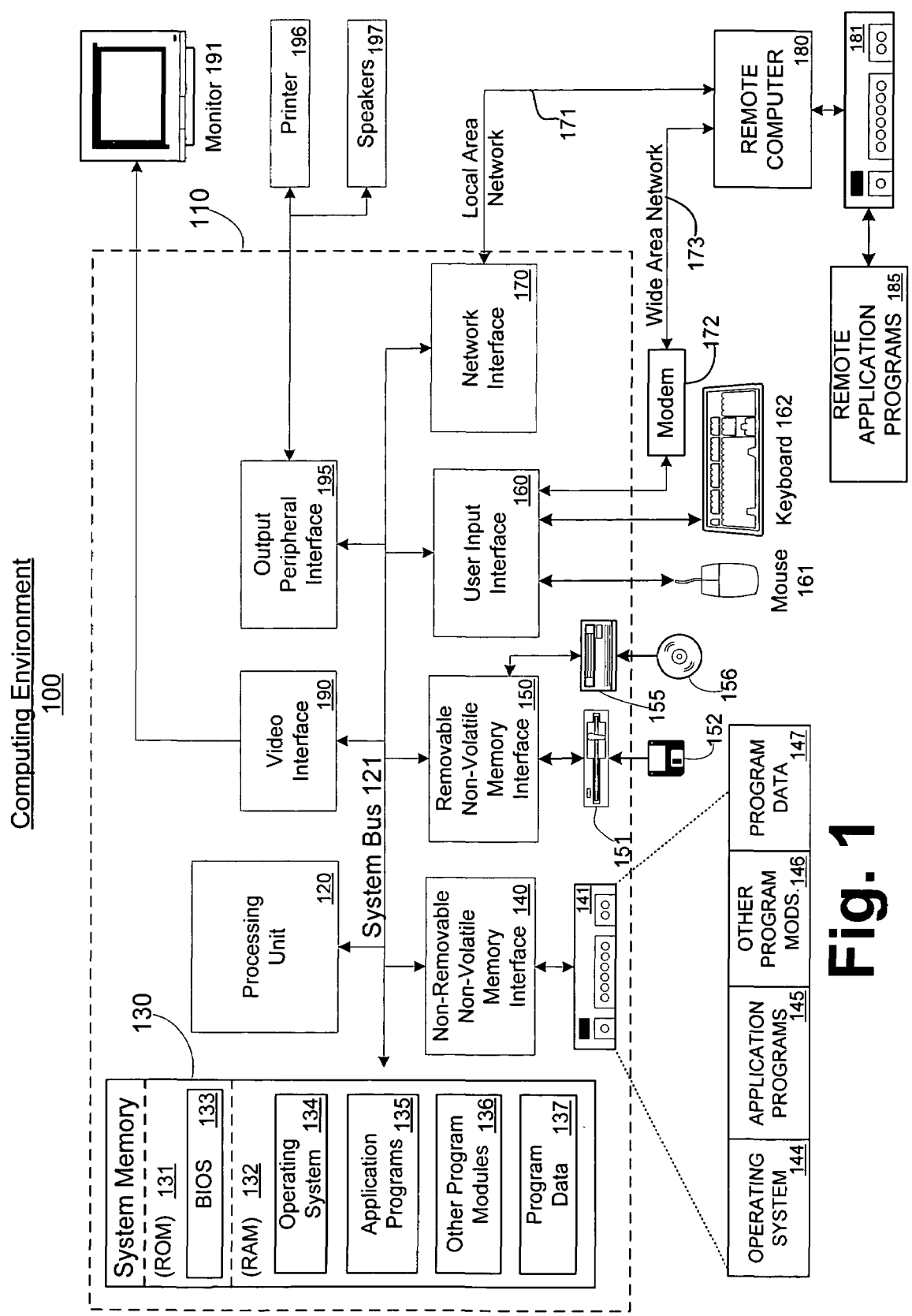
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments

Figure 2:
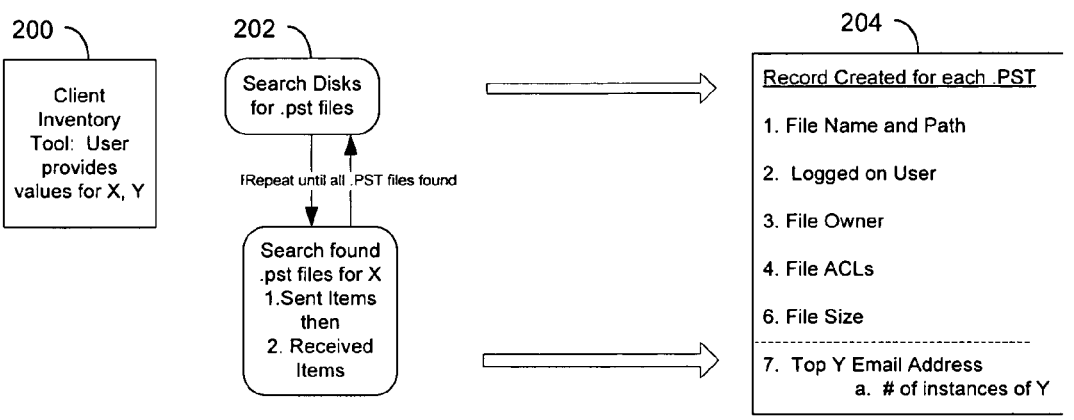
FIGS. 2-3 illustrate exemplary processes that are performed in accordance with the present invention.
Figure 2:
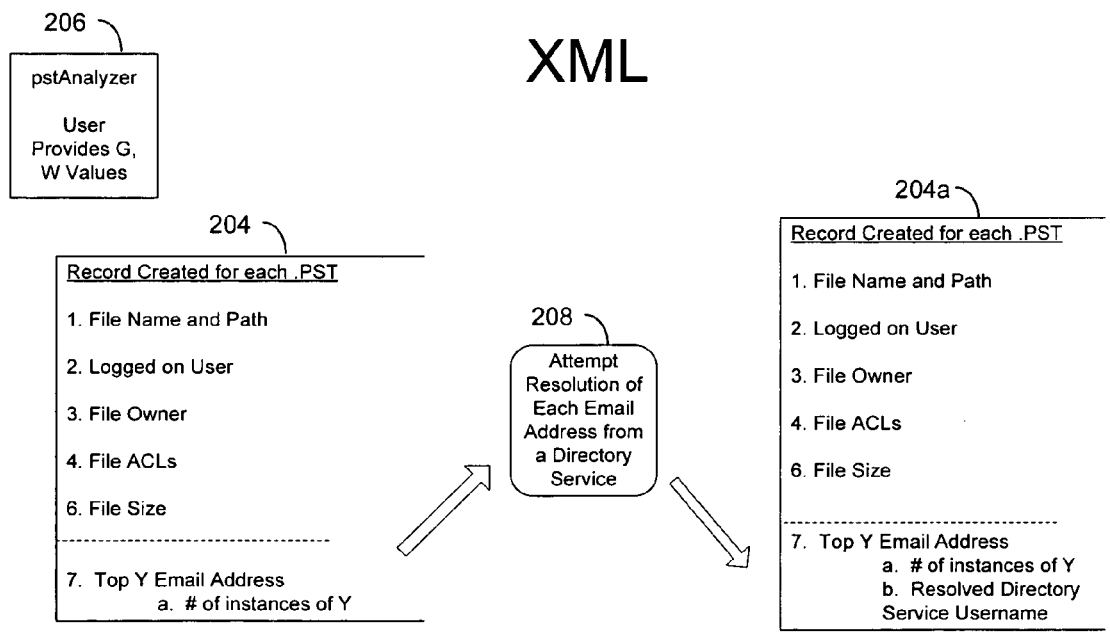
Figure 3:
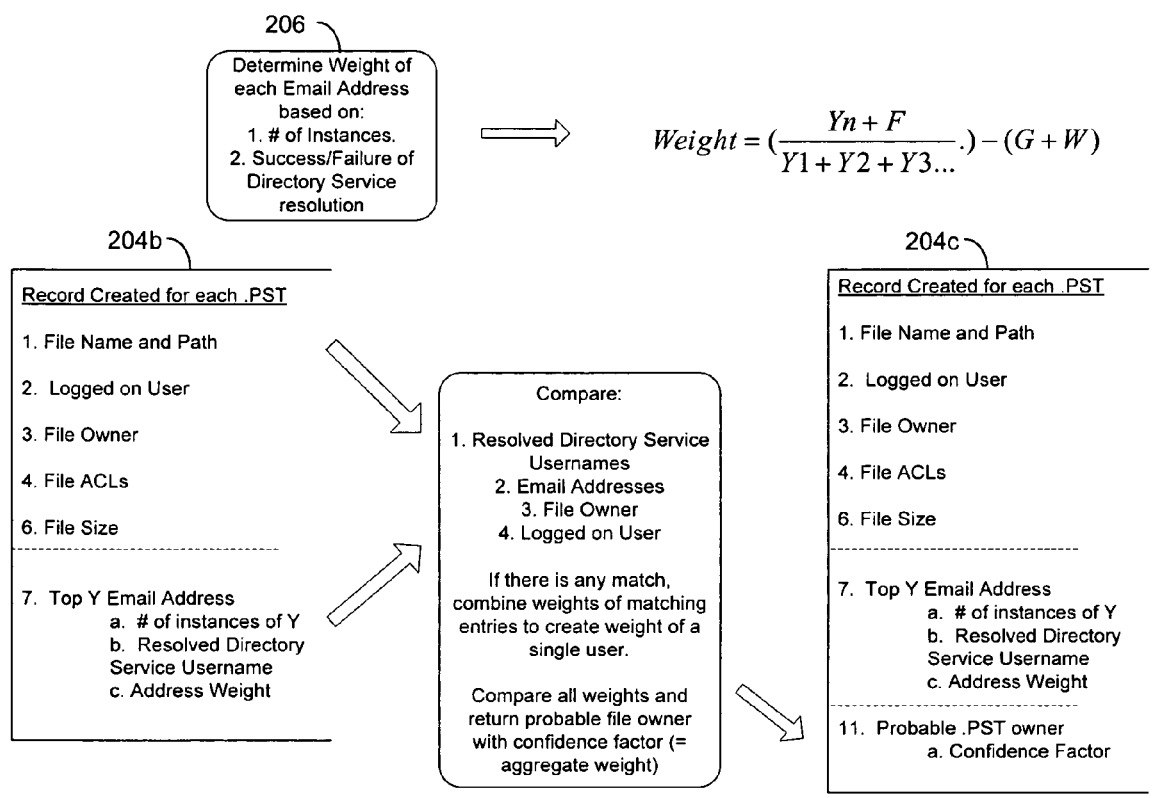

Referring to FIGS. 2 and 3, the present invention provides a probabilistic process to determine the owner of a MICROSOFT OUTLOOK personal store (.pst) or other file through the weighted analysis of several user-specified factors (see, reference numerals 200 and 202). For example, such factors may be placed in a record 204 and may include the file owner, the user who ran the discovery process, the "top Y most frequently occurring addresses when analyzing X number of sent then received messages," a number of occurrences of each of the returned "top Y most frequently occurring addresses," etc. The record 204 may be stored as an XML file and provided to an analysis component 206.

Each of the top Y most frequently occurring addresses are analyzed by the analysis component 206 to calculate its weight according to the following formula:

$$\text{Weight} = \left(\frac{Yn + F}{Y1 + Y2 + Y3...}\right) - (G + W)$$

where:

W=a configurable weight based on Window NT file system (NTFS) file owner

G=a configurable weight set by the user who ran the discovery process

Y1+Y2+Y3 . . . =configurable weights based on the top Y most frequently occurring addresses when analyzing the X number of sent then received messages Yn=number of occurrences of each of the returned top Y most frequently occurring addresses. This is used to determine relative weight against the other top Y most frequently occurring addresses.

F=a configurable weight based on the ability to resolve against a Directory Service (e.g., Active Directory).

Exemplary default values for the various variables are as follows:

X=200
Y=4
F=50
W=0.02
G=0.1

Each address is then compared to the "NTFS File Owner" and "Logged On User" values to determine whether there is an exact match with a Directory Service (e.g., Active Directory) resolved name for the e-mail address (reference numeral 208). If there is a match, that value is returned as the probable Personal Store (.pst) owner and placed in the record 204a.

FIG. 3 illustrates a variation of the above where the combined weights of the matching values in the record 204b are returned as a "confidence factor." If there is no match, the weights of all values will be analyzed and the top weighted entry will be returned as the probable Personal Store (.pst) owner and the combined weights of the matching values will be returned as the "confidence factor" in the record 204c.

In accordance with an aspect of the present invention the determination of the file owner is made without an administrator reading the emails and content within the .pst file as the process of analyzing the file contents may be performed via an automated means. In addition, the present invention can be extended to analyze other types of files containing data from which factors can be derived and weighted (e.g., documents where factors such as the sender and recipient can be weighted, etc.).

An example application of the above will now be described. If an analysis is performed on the first 200 (x=200) messages sent then received in a .pst file and the four (y=4) most frequently occurring email addresses in from and to fields are collected, the following results may be obtained:

| Address | Number of hits |
|---|---|
| richwebb | 80 |
| dkearney | 38 |
| dkeamey@microsoft.com | 40 |
| ms@ms.com | 40 |

Next, it is determined whether each of these addresses resolve against a Directory Service (e.g., Active Directory, an LDAP server, etc.) as shown in FIG. 2. In this case, the first three addresses do resolve to:

REDMOND\richwebb
REDMOND\dkearney
REDMOND\dkearney

The last address, ms@ms.com does not resolve.

Now, for each address, it is determined if the resolved address matches either the collected NTFS file owner or the account of the user who executed the analysis tool of the present invention. If there is an NTFS file owner match the value W is set to 0. If there is an executing user match, the value G is set to 0. If there is no match for NTFS File Owner, then W=0.02. If there is no match for an executing user match, the G=0.1.

Next it is determined if the weight of each of the top Y addresses (y=4).

Richwebb—Resolved against the directory service (e.g., F=50), NTFS file owner match (W=0.02), no executing user match (G=0). The analysis for Richwebb is thus the following:

(80+50)/(80+38+40+40)−(0.02+0)=0.64

Dkearney—Resolved against directory service (F=50), NTFS file owner match (W=0.02), executing user match (G=0.01). The analysis for Dkearney is thus the following:

(38+50)/(80+38+40+40)−(0.02+0.01)=0.41 dkearney@microsoft.com—Resolved against directory (F=50), NTFS file owner match (W=0.02), executing user match (G=0.01). The analysis for dkearney@microsoft.com is thus the following:

(40+50)(80+38+40+40)−(0.02+0.01)=0.42 ms@ms.com—No resolution against directory (F=0), No NTFS file owner match (W=0), no Executing user match (G=0). The analysis for ms@ms.com is thus the following:

(40+0)/(80+38+40+40)−(0+0)=0.20

Next it is determined if any of the top Y addresses (y=4) are in fact duplicates. If they are, their calculated weight values are combined as shown in FIG. 3. In this example, dkearney and dkeamey@microsoft.com both resolved to REDMOND@kearney and are duplicates. As a result, we add their weight values (0.41+0.42).

REDMOND\Richwebb=0.64
REDMOND\dkearney=0.83
ms@ms.com=0.20

Next the result is returned. In this case, REDMOND\kearney has been identified as the .pst file owner with a confidence factor of 0.83.

While the present invention has been described in connection with the preferred embodiments of the various FIGS., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of determining a probable owner of a personal store file in a computer, the method comprising:
    receiving a set of user-specified factors including a first number of most frequently occurring addresses and a second number of sent-then-received electronic messages to be analyzed for said first number of most frequently occurring addresses;
    determining the first number of most frequently occurring addresses among the second number of sent-then-received electronic messages within said personal store file;
    applying a weight to each of said first number of determined most frequently occurring addresses based on a number of occurrences of each of said first number of determined most frequently occurring addresses and one or more user-specified factors of the set of user-specified factors;
    determining a relative weight of each of said first number of determined most frequently occurring addresses;
    determining if any of said first number of determined most frequently occurring addresses are duplicate addresses;
    summing the relative weights of duplicate addresses to create a combined relative weight and setting the relative weight of one of the duplicate address to the combined relative weight;
    returning a top weighted address of said first number of determined most frequently occurring addresses as said probable owner of said personal store file with a confidence factor derived from the relative weight and the set of user-specified factors.

2. The method of claim 1, further comprising:
    determining an operating system file owner of said personal store file;
    applying a first weighted value to said operating system file owner; and
    using said first weighted value to determine said relative weight of each said frequently occurring address.

3. The method of claim 1, further comprising:
    determining if each said frequently occurring address resolves against a directory service;
    applying a second weighted value if said frequently occurring address resolves against the directory service; and
    using said second weighted value to determine said relative weight of each said frequently occurring address.

4. The method of claim 1, further comprising:
    determining an identity of a user who is performing said method;
    applying a third weighted value to said identity; and
    using said third weighted value to determine said relative weight of each said frequently occurring address.

5. The method of claim 1, wherein said step of determining said relative weights further comprises applying the following relationship:

$$\text{Weight} = \left(\frac{Yn + F}{Y1 + Y2 + Y3\ldots}\right) - (G + W)$$

where:
W = a configurable weight based on an operating system file owner;
G = a configurable weight set by a user performing said method;
Y1+Y2+Y3 ... = configurable weights based on said predetermined number of most frequently occurring addresses;
Yn = number of occurrences of each said frequently occurring address; and
F = a configurable weight based on the ability to resolve against a directory service.

6. The method of claim 1, further comprising performing said method without a user viewing the contents of said personal store file.

7. A method of determining an owner of an electronic file in a computer, the method comprising:
    receiving a set of one or more user-specified factors associated with said electronic file, wherein said user-specified factors include a first number of most frequently occurring addresses among a second number of sent-then-received electronic messages within said electronic file to be analyzed for said first number of most frequently occurring addresses;
    determining the first number of most frequently occurring addresses among the second number of sent-then-received electronic messages within said personal store file;
    applying weights to said user-specified factors;
    defining a first factor that is to be compared to others of said user-specified factors, wherein the first factor is defined as a number of occurrences of each of said first number of determined most frequently occurring addresses;
    determining a relative weight for each of said first number of determined most frequently occurring addresses;
    determining if any of said first number of determined most frequently occurring addresses are duplicate addresses:
    summing the relative weights of duplicate addresses to create a combined relative weight and setting the relative weight of one of the duplicate address to the combined relative weight; and
    returning a top weighted address of said first number of determined most frequently occurring addresses as said owner of said electronic file with a confidence factor derived from the relative weight and the set of user-specified factors.

8. The method of claim 7, further comprising:
    defining an operating system file owner of said electronic file as a second factor;
    applying a second weighted value to said second factor; and
    using said second weighted value to determine said relative weight of each of said frequently occurring addresses.

9. The method of claim 7, further comprising:
    determining if each said most frequently occurring address resolves against a directory service;

applying a third weighted value to each said frequently occurring address that resolves against the directory service; and using said third weighted value to determine said relative weight of each said frequently occurring address.

10. The method of claim 7, further comprising:

defining an identity of a user who is performing said method as a fourth factor;

applying a fourth weighted value to said fourth factor; and using said fourth weighted value to determine said relative weight of each of said most frequently occurring addresses.

11. The method of claim 7, wherein said step of determining said relative weight further comprising applying the following relationship:

$$\text{Weight} = \left(\frac{Yn + F}{Y1 + Y2 + Y3\ldots}\right) - (G + W)$$

where:

W = a configurable weight based on an operating system file owner;

G = a configurable weight set by a user performing said method;

Y1+Y2+Y3 ... = configurable weights based on said first factor of said several factors;

Yn = number of occurrences of each said candidate; and

F = a configurable weight based on the ability to resolve against a directory service.

12. The method of claim 7, further comprising performing said method without a user viewing the contents of said electronic file.

13. A method of determining ownership of an electronic file containing e-mail messages in a computer, the method comprising:

receiving a set of user-specified factors including a first number of most frequently occurring addresses and a second number of sent-then-received e-mail messages to be analyzed for said first number of most frequently occurring addresses;

determining a the first number of most frequently occurring addresses among the-second number of sent-then-received e-mail messages within said electronic file, applying a weight to each of said first number of determined most frequently occurring addresses based on a number of occurrences of each of said first number of determined most frequently occurring addresses and one or more user-specified factors of the set of user-specified factors;

determining a relative weight of each of said first number of determined most frequently occurring addresses;

determining if any of said first number of determined most frequently occurring addresses are duplicate addresses;

summing the relative weights of duplicate addresses to create a combined relative weight and setting the relative weight of one of the duplicate address to the combined relative weight; and determining said ownership of said electronic file in accordance with the relative weight of each of said first number of determined most frequently occurring addresses with a confidence factor derived from the relative weight and the set of user-specified factors.

14. The method of claim 13, further comprising:

determining if each of said most frequently occurring addresses resolves against a directory service;

weighting each of said most frequently occurring addresses in accordance with whether said each of said most frequently occurring addresses resolves against the directory service; and determining said ownership further in accordance with said weighting.

15. The method of claim 13, further comprising:

determining an operating system owner of said electronic file;

applying a weight to said operating system owner; and determining said ownership further in accordance with said weighting.

16. The method of claim 13, further comprising;

determining an identity of a user who is performing said method;

weighting said identity; and determining said ownership further in accordance with said weighting.

* * * * *